United States Patent [19]

Ferguson

[11] Patent Number: 4,901,812
[45] Date of Patent: Feb. 20, 1990

[54] VARIABLE EFFORT STEERING SYSTEM

[75] Inventor: Michael A. Ferguson, Birmingham, Mich.

[73] Assignee: General Motors Corporation, Detroit, Mich.

[21] Appl. No.: 272,023

[22] Filed: Nov. 16, 1988

[51] Int. Cl.⁴ .............................................. B62D 5/08
[52] U.S. Cl. ................................... 180/142; 60/468; 180/143
[58] Field of Search ....................... 180/142, 143, 132; 60/468

[56] References Cited

U.S. PATENT DOCUMENTS

| | | | |
|---|---|---|---|
| 2,657,533 | 11/1953 | Schanzlin et al. | 60/468 |
| 4,300,650 | 11/1981 | Weber | 180/143 X |
| 4,609,331 | 9/1986 | Duffy | 180/142 X |
| 4,629,025 | 12/1986 | Brasier et al. | 180/142 |
| 4,768,604 | 9/1988 | Schipper | 180/143 |

FOREIGN PATENT DOCUMENTS 1814761  6/1970  Fed. Rep. of Germany ...... 180/132
99262   5/1987  Japan .................................. 180/143

Primary Examiner—Mitchell J. Hill
Attorney, Agent, or Firm—Saul Schwartz

[57] ABSTRACT

A bypass type variable effort power steering system including a bypass valve in a bypass duct connected at opposite ends to the working chambers of a steering assist fluid motor and a throttling valve in the bypass duct in series flow relationship with the bypass valve. The throttling valve has a valve element spring biased to a centered position between valve seats of the throttling valve. When the bypass valve is open, the springs hold the valve element in the centered position until bypass flow exceeds a transition flow rate characteristic of substantial pressure differences between the working chambers of the fluid motor. At bypass flow rates above the transition flow rate, a pressure force is induced on the valve element which overcomes the spring force and moves the valve element to a seated position on one of the valve seats. When the valve element is seated, bypass flow is blocked and power assist is maximized.

6 Claims, 2 Drawing Sheets

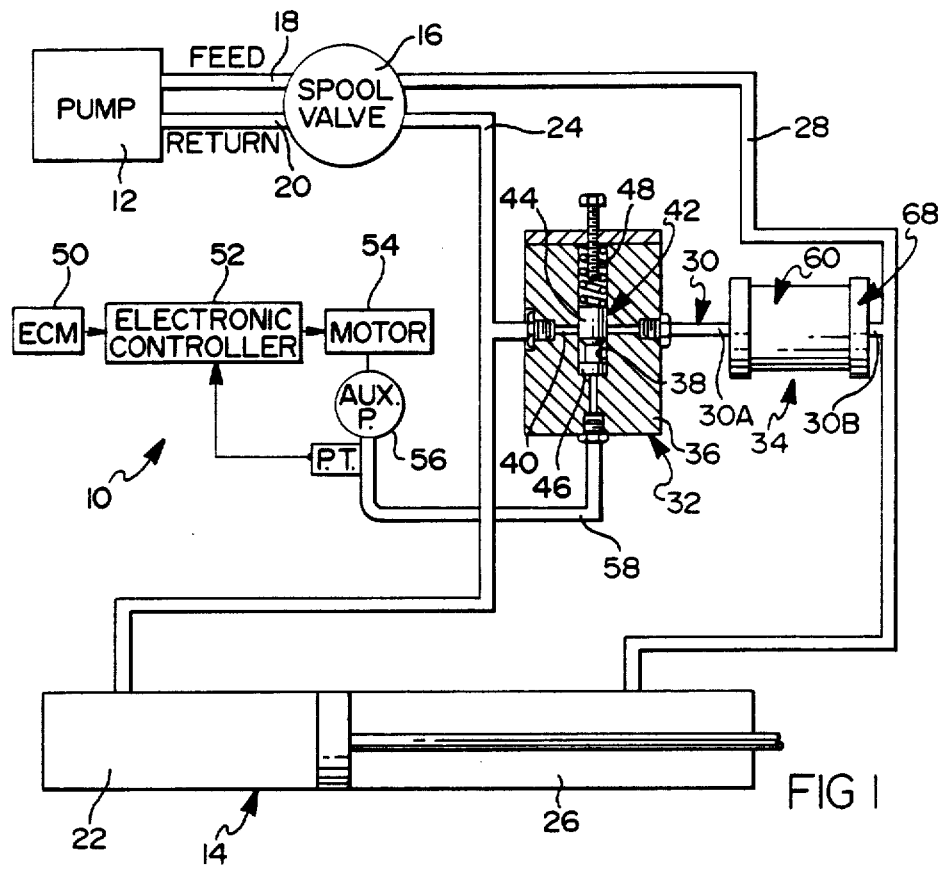
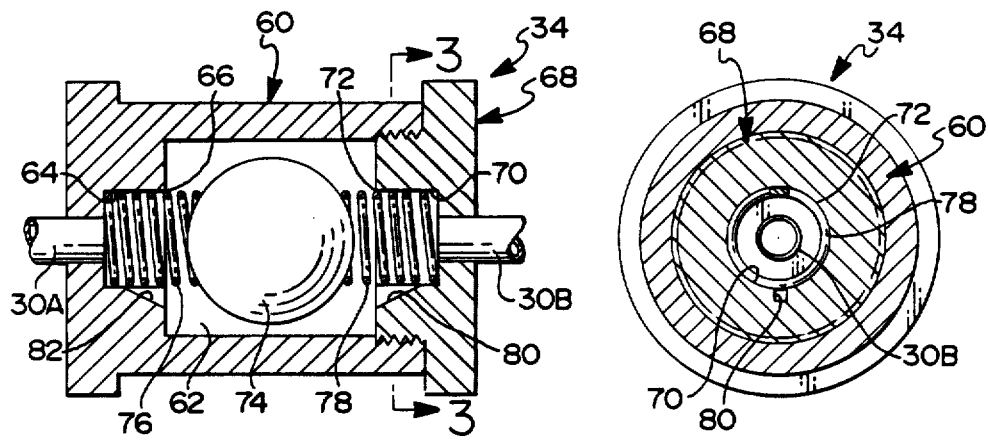
FIG 1
FIG 2
FIG 3

VARIABLE EFFORT STEERING SYSTEM

FIELD OF THE INVENTION

This invention relates to variable effort power steering systems for automotive vehicles.

BACKGROUND OF THE INVENTION

Conventional power steering systems for automobiles reduce the effort required by the driver to turn the steering wheel during parking and during steering at low speed where unassisted manual effort is high. Such conventional power steering systems also furnish power assist at higher vehicle speeds where the unassisted manual effort is considerably lower. U.S. Pat. Application Ser. No. 069818, filed 6 July 1987 now U.S. Pat. No. 4,768,604 by William Schipper and assigned to the assignee of this invention, describes a bypass type variable effort power steering system wherein the high pressure side of the steering assist fluid motor is progressively bypassed to the low pressure side of the fluid motor as vehicle speed increases to reduce the power assist at higher speed. A bypass type variable effort power steering system according to this invention incorporates a valve which increases the level of power assist as a function of the rate of fluid flow in the steering system.

SUMMARY OF THE INVENTION

This invention is a new and improved bypass type variable effort power steering system for automotive vehicles including a steering assist fluid motor having a pair of working chambers connected in alternate fashion by a steering gear control valve to a pump and to a reservoir, a bypass duct between the working chambers, and a vehicle speed responsive bypass valve which blocks the bypass duct at low speed so the working chambers are isolated from each other and progressively opens the bypass duct at higher speeds to bypass the high pressure working chamber to the low pressure working chamber and to the reservoir for less power assist at higher vehicle speeds. In the power steering system according to this invention, a throttling valve is disposed in the bypass duct in series with the bypass valve and is fully open when the bypass flow rate is at or below a transition flow rate corresponding to ordinary steering maneuvers and which increases power assist by throttling bypass flow at higher bypass flow rates characteristic of more rapid steering maneuvers such as evasive actions. In a preferred embodiment of the steering system according to this invention, the throttling valve has a valve housing with a center chamber therein, a pair of valve seats at opposite ends of the center chamber, and a spherical valve element in the center chamber biased by springs on opposite sides of the element to a center position mid-way between the valve seats. When bypass flow is below the transition flow rate, the valve element stays centered. When bypass flow is above the transition flow rate, a pressure difference across the valve element overcomes one of the springs and the element moves toward the corresponding one of the valve seats thereby to throttle bypass flow and increase the level of power assist. Passages are provided across the valve seats so that a minimum bypass flow is maintained when the valve element is seated on the valve seat.

BRIEF DESCRIPTION OF THE DRAWINGS

FIG. 1 is a schematic diagram of a bypass type variable effort power steering system according to this invention;

FIG. 2 is an enlarged sectional view of a portion of FIG. 1 showing the throttling valve;

FIG. 3 is a sectional view taken generally along the plane indicated by lines 3—3 in FIG. 2;

DESCRIPTION OF PREFERRED EMBODIMENTS

Figure 4:
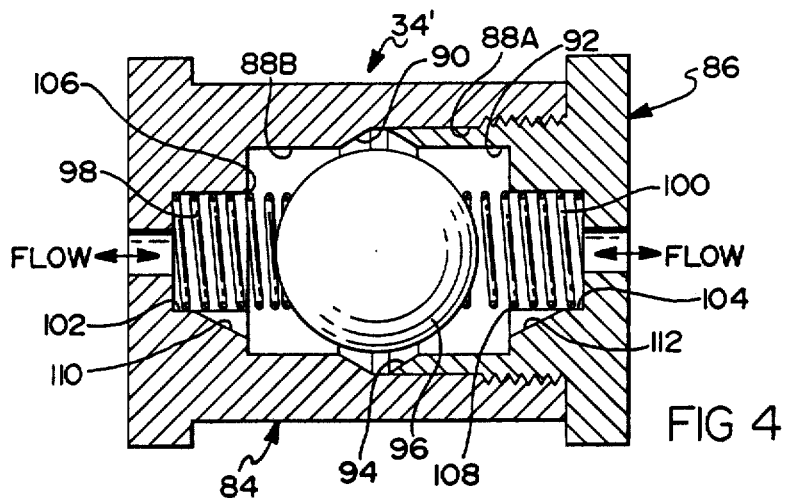
FIG. 4 is similar to FIG. 2 but showing a first modified throttling valve.

Referring to FIG. 1 of the drawings, a schematically illustrated bypass type variable effort power steering system 10 according to this invention includes an engine driven power steering pump 12, a steering assist fluid motor 14 and a rotary power steering control valve 16. The pump 12, the motor 14 and the valve 16 are conventional power steering elements.

The pump 12 delivers pressure fluid to the control valve 16 through a feed 18 and returns overflow and exhaust fluid to a reservoir, not shown, through a return 20. The control valve 16 distributes pressure fluid to and exhausts return fluid from a first working chamber 22 of the fluid motor 14 through a first duct 24. The control valve 16 distributes pressure fluid to and exhausts return fluid from a second working chamber 26 of the fluid motor 14 through a second duct 28. The first and second ducts 24 and 28 are interconnected by a bypass duct 30 in which are located in series flow relationship a speed responsive bypass valve 32 and a flow responsive throttling valve 34.

A bypass valve 32 which may be employed in the steering system 10 is described in aforesaid U.S. Pat. Application Ser. No. 069818. Briefly, the bypass valve 32 includes a housing 36 having a main bore 38 and a cross bore 40. The cross bore 40 forms a segment of the bypass duct 30. A valve spool 42 having a big land 44 and a small land 46 is slidable in the main bore 38. A spring 48 biases the spool 42 to a closed position, FIG. 1, in which the big land 44 blocks the cross bore 40. In the closed position of the spool 42, the bypass duct is blocked with respect to fluid flow in either direction.

The operation of the bypass valve 32 is dictated by an electronic control module (ECM) 50, an electronic controller 52, an electric motor 54, and an auxiliary pump 56. Among other functions, the ECM monitors the speed of the vehicle on which steering system 10 is installed and generates an electronic signal corresponding to vehicle speed. The speed signal is delivered to the controller 52 which is programmed to energize the motor 54 and drive the auxiliary pump 56 such that the pump furnishes a control pressure in a control duct 58 proportional to vehicle speed.

The control duct 58 is connected to the main bore 38 in the bypass valve housing 36 such that the control pressure operates on the end of the small land 46 of the spool 42 against the spring 48. As vehicle speed increases, control pressure likewise increases and strokes the spool 42 from the closed position, FIG. 1, through a plurality of progressively further displaced open positions in which the cross bore 40 is progressively less blocked by the big land 44 of the spool. As the cross bore 40 becomes progressively less blocked, progressively more fluid is bypassed from the high pressure side of the fluid motor to the low pressure side.

Referring to FIGS. 1-3, the throttling valve 34 includes a cup-shaped housing 60 having a center chamber 62 with a cylindrical counterbore 64 at the bottom thereof. A portion 30A of the bypass duct 30 between the bypass valve 32 and the throttling valve 34 opens into the center chamber 62 through a first circular valve seat 66 defined at the lip of the counterbore 64.

The center chamber 62 is closed by a cap 68 threaded into the open end of the housing. The cap has a counterbore 70 aligned with the counterbore 64. A portion 30B of the bypass duct 30 between the throttling valve and the duct 28 opens into the center chamber 62 of the housing 60 through a second circular valve seat 72 defined at the lip of the counterbore 70.

A spherical valve element 74 is disposed in the center chamber 62. A first spring 76 seated in the counterbore 64 bears against one side of the valve element 74. A second spring 78 seated in the counterbore 70 bears against the other side of the valve element 74. The springs 76,78 cooperate to normally resiliently suspend the valve element 74 in a centered position, FIG. 2, mid-way between the valve seats 66 and 72. A first notch 80, FIGS. 2 and 3, in the cap 68 across the valve seat 72 defines a flow path of minimum area when the valve element 74 is seated on valve seat 72. Similarly, a second notch 82, FIG. 2, defines a flow path of minimum area when the valve element 74 is seated on the valve seat 66.

The steering system 10 according to this invention operates as follows. Whenever the engine of the vehicle is operating, the pump 12 delivers fluid to the open center steering control valve 16 through the feed 18. With no input at the vehicle's steering wheel, not shown, the fluid recirculates at low pressure back to the reservoir through the return 20. Whether the vehicle is standing still or moving, the first and second ducts are ported equally to the feed 18 and to the return 20 so there is no pressure difference across the fluid motor piston or between the first and second ducts 24 and 28.

At low vehicle speeds, the pressure in the control duct 58 from the auxiliary pump 56 is too low to stroke valve spool 42 against the spring 48 in the bypass valve 32 so that the bypass duct 30 remains blocked. When the steering control valve 16 is actuated by manual effort at the steering wheel, one of the working chambers 22,26 is ported to the feed 18 while the other is ported to the return 20. The pressure differential thus created furnishes the steering assist and no fluid flows through the blocked bypass duct 30.

As the vehicle attains and then surpasses the speed at which it is desired to reduce the level of power assist for steering, the bypass duct 30 becomes progressively less blocked by the big land 44 of the spool 42 as the pressure in the control duct 58 overcomes the spring 48 to stroke the valve spool 42 from the closed position through its plurality of open positions. If the steering wheel is not turned as speed increases, the valve element 74 in the throttling valve 34 stays in the centered position, FIG. 2, with a bypass fluid flow path being defined between the valve seats 66,72 around the valve element. There is no bypass fluid flow, however, as long as the steering wheel is not turned because there is no pressure difference between the first and second ducts 24 and 28.

If the driver steers the vehicle with normal, relatively small steering inputs, transient pressure differences develop between the first and second ducts 24 and 28. Bypass flow is induced in the bypass duct from the high pressure one of the ducts 24,28 to the low pressure one which bypass flow reduces the pressure difference between the working chamber 22,26 so less power assist is provided than would be the case if the bypass duct 30 were completely blocked. In the throttling valve 34, the area of the flow path around the valve element 74 is such that for bypass fluid flow rates associated with normal steering, only a relatively insignificant pressure drop develops across the valve element 74 so that the valve element stays close to its centered position, FIG. 2. Accordingly, the steering feels more like manual to the driver due to the reduced level of power assist.

If the driver steers the vehicle with more rapid, relatively greater steering inputs, greater pressure differences develop between the first and second ducts 24 and 28. The greater pressure differences induce increased bypass flow through the bypass duct 30 and an increased pressure drop across valve element 74 in the direction of bypass fluid flow. At a predetermined transition bypass flow rate through the bypass duct 30, the pressure drop across the valve element exceeds the bias of the corresponding one of the springs 76,78 and the valve element moves toward the corresponding one of the valve seats 62,72. As the gap between the valve element and the corresponding valve seat narrows, bypass flow is throttled and the pressure drop across the valve element further increases and the valve element is driven onto the valve seat effectively terminating the bypass and raising the power assist level almost to that which prevails at low speed. The notches 80 and 82 are important features of this invention and operate to smooth the transition from low power assist to almost full power assist as the valve element seats on the corresponding one of the seats 72 and 66.

Referring to FIG. 4, a modified throttling valve 34' includes a cup shaped housing 84 and a cup-shaped threaded cap 86 on the housing. The inner wall of the housing is stepped and has a big diameter inner wall 88A and a small diameter inner wall 88B interconnected by an annular shoulder 90. The cup-shaped cap 86 fits in the big diameter inner wall of the housing and has a cylindrical inner wall 92 which terminates at an annular beveled end 94. The diameter of the inner wall 92 is the same as the small diameter inner wall 88B of the housing and the shoulder 90 faces the beveled end 94. A spherical valve element 96 is disposed between a pair of springs 98 and 100 seated in a corresponding pair of counterbores 102 and 104 in the housing and cap, respectively. The circular edges of the counterbores 102 and 104 define a pair of valve seats 106 and 108, respectively, for the valve element and are interrupted by a pair of notches 110 and 112, respectively.

The modified throttling valve 34' functions like the throttling valve 34 but incorporates features for tailoring the throttling of bypass flow. For example, in the centered position of the valve element 96, FIG. 4, the bypass flow area around the valve element is maximum. At the transition flow rate through the bypass duct 30, the valve element begins moving toward one of the valve seats and the flow area around the valve element decreases as the valve element moves into the corresponding one of the inner walls 88B,92. Due to the reduced clearance between the valve element and the corresponding one of the inner walls 88B,92, flow is throttled and power assist increases to a first level. When the valve element finally seats on the corresponding one of the valve seats 106,108, bypass flow is substantially terminated and power assist increases further to almost maximum assist. The features of the valve 34' which impact its performance are the initial separation between the shoulder 90 and the beveled end 94, the diameters of the inner walls 88B and 92, and the axial separation between the valve seats 106 and 108.

Figure 5:
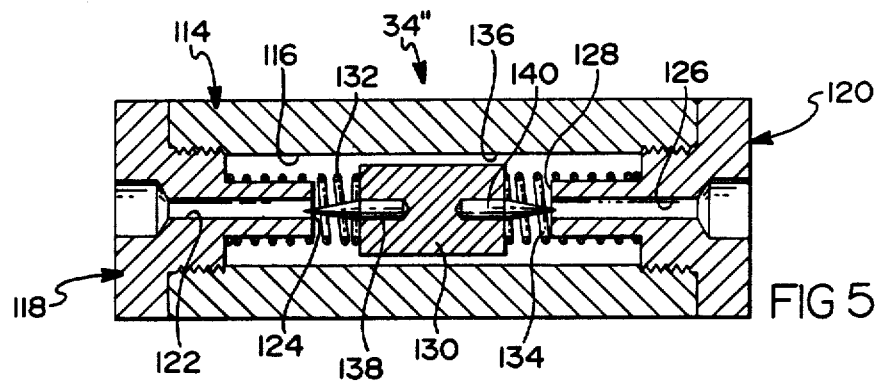
FIG. 5 is similar to FIG. 2 but showing a second modified throttling valve.

A second modified throttling valve 34" is illustrated in FIG. 5. The valve 34" has a housing 114 with a cylindrical bore 116 therethrough. The bore is closed at opposite ends by a pair of end caps 118 and 120 threaded on the housing. The end cap 118 has a passage 122 therethrough which terminates at a circular valve seat 124. Similarly, the end cap 120 has a passage 126 therethrough which terminates at a circular valve seat 128. A slider 130 is suspended in the bore 116 midway between the valve seats by a pair of springs 132 and 134 bearing against the slider and against the end caps 118 and 120, respectively. A clearance annulus 136 is defined between the slider and the bore. The slider 130 carries a pair of needles 138 and 140 the pointed ends of which are aligned with the end cap passages 122 and 126, respectively.

Below the transition bypass flow rate, the slider remains in a centered position, FIG. 5, and bypass flow is unthrottled. At and above the transition bypass flow rate, the clearance annulus restricts bypass flow to produce a pressure drop across the slider sufficient to overcome one of the springs 132 and 134 and move the slider. As the slider moves, the corresponding one of the needles progressively throttles bypass flow through the corresponding valve seat 124,128 to reduce bypass flow and increase power assist. The throttling at the needles 138,140 does not significantly change the pressure drop across the slider 130 and, therefore, does not drive the slider against the valve seats.

Figure 6:
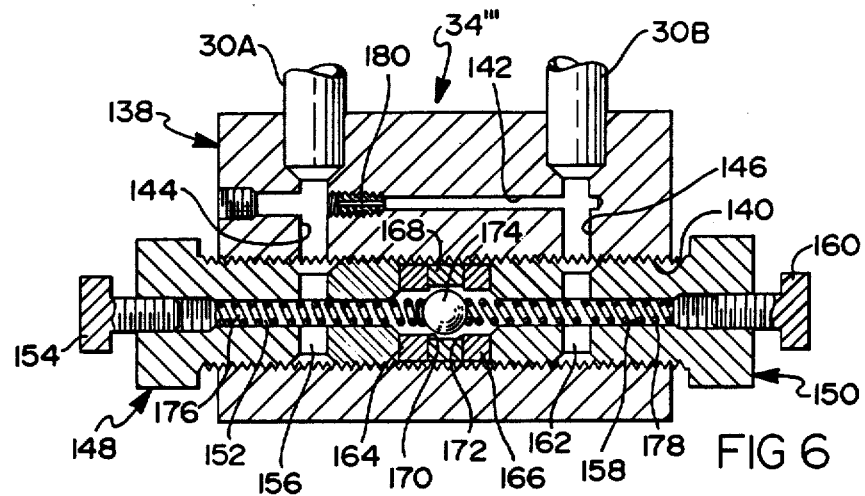
FIG. 6 is similar to FIG. 2 but showing a third modified throttling valve.

A third modified throttling valve 34''' is illustrated in FIG. 6. The valve 34''' includes a housing 138 having a threaded main bore 140, a closed parallel bore 142, and a pair of cross bores 144 and 146 interconnecting the main and parallel bores. The portions 30A and 30B of the bypass duct 30 are connected to the cross bores 144 and 146, respectively. The main bore is closed at opposite ends by a pair of end caps 148 and 150 threaded on the housing. The end cap 148 has an axial passage 152 therethrough closed by an adjusting screw 154 and a transverse passage 156 therethrough aligned with the cross bore 144 in the housing. Likewise, the end cap 150 has an axial passage 158 therethrough closed by an adjusting screw 160 and a transverse passage 162 therethrough aligned with the cross bore 146 in the housing. A pair of rings 164 and 166 are disposed between the end caps and are separated by a spacer 168. The rings 164 and 166 define respective ones of a pair of circular valve seats 170 and 172. A spherical valve element 174 is suspended midway between the valve seats by a pair of springs 176 and 178 in the axial passages 152 and 158 which bear against the valve element and against the adjusting screws 154 and 160. An orifice element 180 is located in the parallel bore 142 between the cross bores 144 and 146.

The throttling valve 34''' functions like the throttling valves 34, 34' and 34". The adjusting screws 154 and 160 operate to vary the preload on the valve element 174 whereby the transition bypass flow rate is adjusted. When the pressure drop across the valve element 174 is sufficient to seat the element on one of the valve seats 170 and 172, a minimum bypass flow is maintained through the orifice element 180 in the parallel bore 142.

The embodiment of the invention in which an exclusive property or privilege is claimed are defined as follows:

1. In a bypass type variable effort power steering system including
   a steering assist fluid motor having a first working chamber and a second working chamber,
   a pump,
   a steering control valve connected to said pump and to said first working chamber and to said second working chamber operative to port one of said said first and said second working chambers to said pump while concurrently porting the other of said said first and said second working chambers to a low pressure fluid exhaust, and
   a bypass valve in a bypass duct connected to said first working chamber and to said second working chamber having a closed position wherein said bypass duct is blocked and an open position wherein said bypass duct is open for bypass fluid flow from said one working chamber to said low pressure fluid exhaust,
   the improvement comprising:
   a throttling valve housing including a center chamber having a first opening to said bypass duct and a second opening to said bypass duct spaced from said first opening,
   means in said center chamber defining a first valve seat at said first opening to said bypass duct and a second valve seat at said second opening to said bypass duct,
   a valve element disposed in said center chamber for movement between a centered position generally mid-way between said first and said second valve seats and a seated position engaging one of said first and said second valve seats, and
   spring means between said valve element and said throttling valve housing normally maintaining said valve element in said centered position,
   said valve element in said centered position thereof cooperating with said center chamber in said throttling valve housing in defining a bypass flow path between said first and said second valve seats having a flow area calculated to induce a pressure force on said valve element exceeding the force exerted by said spring means when said bypass fluid flow rate exceeds a transition flow rate characteristic of a substantial pressure difference between said one working chamber and said low pressure fluid exhaust so that said valve element is moved by said pressure force to said seated position wherein said bypass flow path is blocked.

2. The bypass type variable effort power steering system recited in claim 1 wherein
   said throttling valve element is a sphere.

3. The bypass type variable effort power steering system recited in claim 2 further including
   means on said throttling valve housing defining a bypass around each of said first and said second valve seats so that a minimum bypass flow is maintained is maintained in said seated position of said valve element on said said one of said first and said second valve seats.

4. The bypass type variable effort power steering system recited in claim 3 wherein said bypass around said first valve seat is a notch in said valve housing across said first valve seat and said bypass around said second valve seat is a notch in said valve housing across said second valve seat.

5. The bypass type variable effort power steering system recited in claim 3 wherein
said bypass around each of said first and said second valve seats includes a second passage in said throttling valve housing connected to said bypass duct in parallel flow relationship with said first passage in said throttling valve housing, and
means defining a minimum flow orifice in said second passage.

6. The bypass type variable effort power steering system recited in claim 1 wherein
said throttling valve element is a valve shuttle having a first needle projecting from one end thereof and a second needle projecting from the other end thereof,
each of said first and said second needles projecting progressively further into respective ones of said first and said second valve seats when said valve shuttle moves from said centered position toward said seated position on said one of said first and said second valve seats.

* * * * *